United States Patent [19]
Evans

[11] Patent Number: 4,812,031
[45] Date of Patent: Mar. 14, 1989

[54] CAMOUFLAGE EYEGLASSES

[76] Inventor: Tony Evans, 5672 Fawn Dr., Powder Springs, Ga. 30073

[21] Appl. No.: 130,010

[22] Filed: Dec. 8, 1987

[51] Int. Cl.4 .......................... G02C 7/16; G02C 9/00
[52] U.S. Cl. ......................................... 351/46; 351/47
[58] Field of Search ...................... 351/49, 45, 46, 47, 351/48, 137

[56] References Cited

U.S. PATENT DOCUMENTS

| | | | |
|---|---|---|---|
| 3,413,057 | 11/1968 | Carmichael | 351/47 |
| 3,876,245 | 8/1975 | Loughner | 351/47 |
| 4,740,069 | 4/1988 | Baum | 351/137 |

FOREIGN PATENT DOCUMENTS 0119784 10/1918 United Kingdom ................. 351/47

Primary Examiner—Rodney B. Bovernick
Assistant Examiner—Jay Ryan
Attorney, Agent, or Firm—Thomas & Kennedy

[57] ABSTRACT

A pair of camouflage eyeglasses for concealing the eyes of a hunter comprise two temple portions and a front frame portion defining a pair of eye encircling rims. Mounted in each rim is an open-weave camouflage netting material having colors and patterns adapted to blend into various hunting terrains. The netting mesh is sized to camouflage effectively the eyes of the hunter while not significantly interfering with his vision.

12 Claims, 2 Drawing Sheets

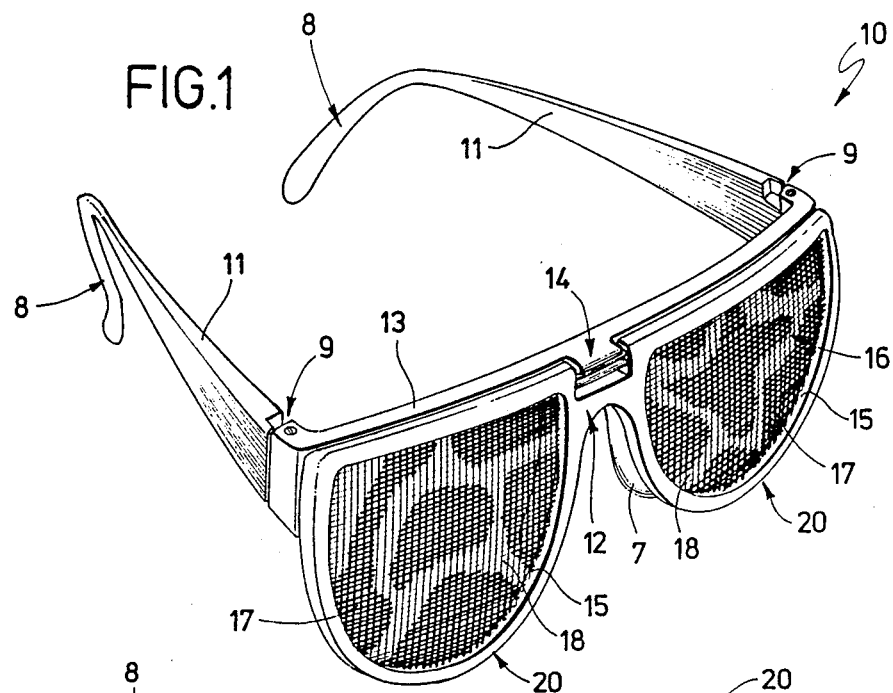
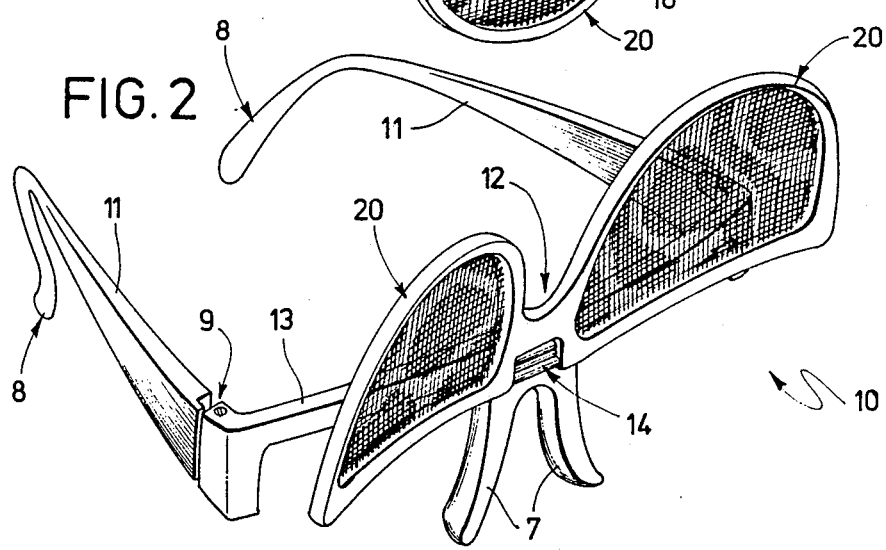

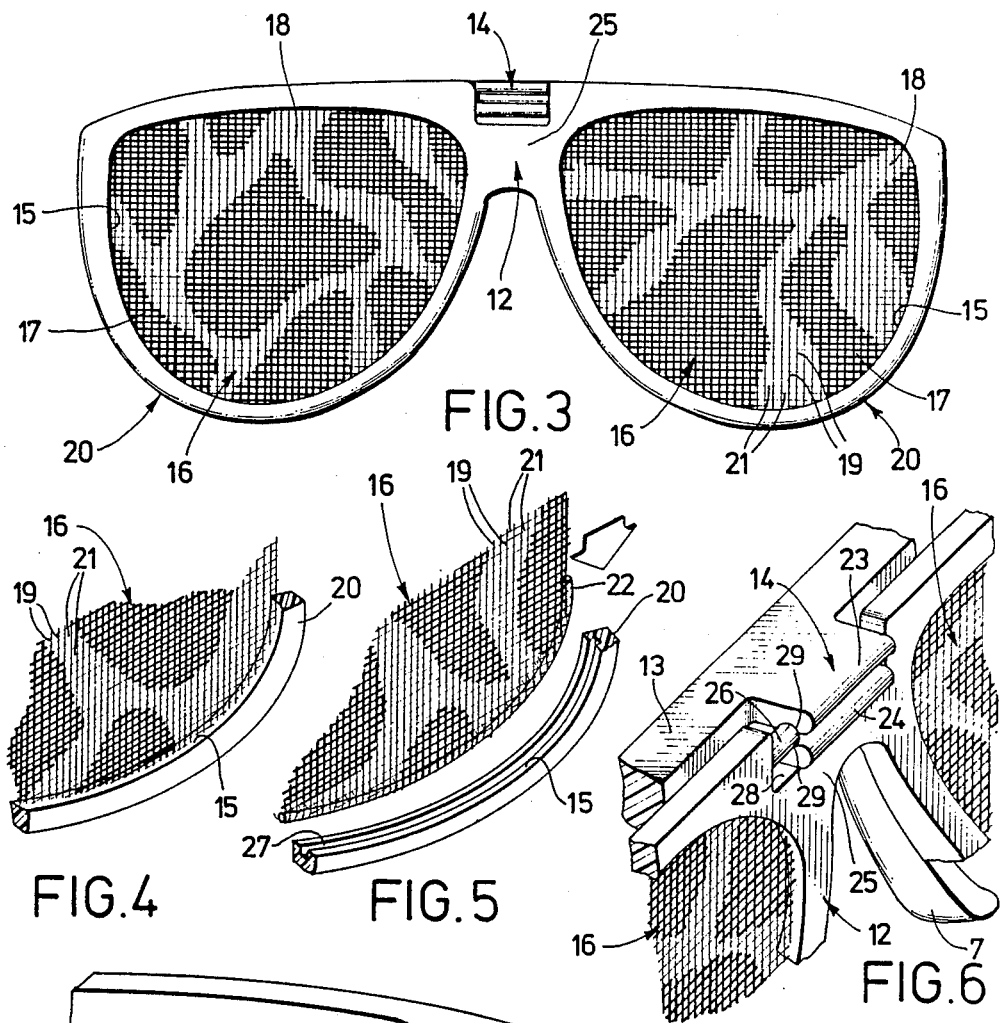
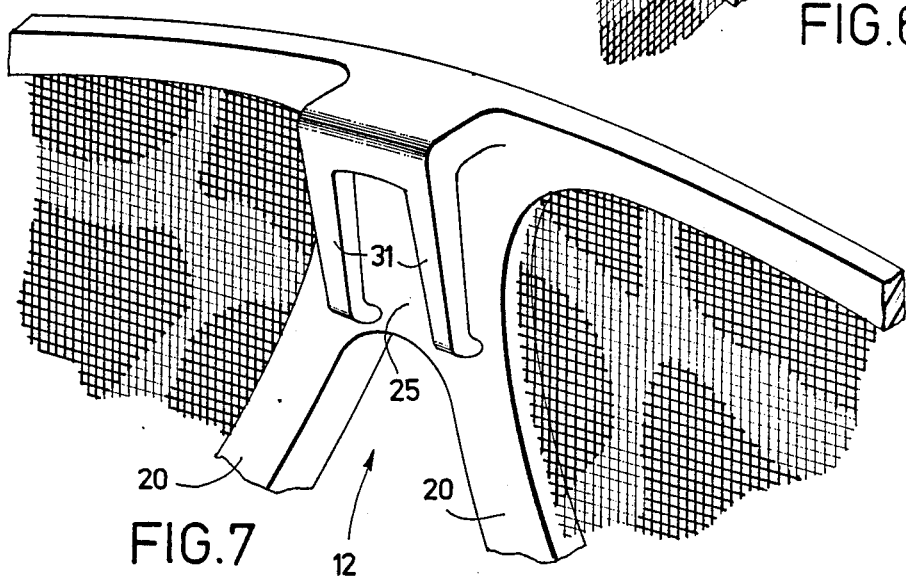

CAMOUFLAGE EYEGLASSES

TECHNICAL FIELD

The present invention relates to hunting equipment and, more particularly, to devices for concealing a hunter's eyes from potential prey.

BACKGROUND OF THE INVENTION

When hunting wild game, it is common for a hunter to conceal his presence from potential prey by wearing camouflage clothing having various color patterns adapted to blend into the terrain where he will be hunting. Certain species of game such as, for example, deer and wild turkey, have particularly keen eyesight and are able to detect the whites of a hunter's eyes at considerable distances. When hunting these species, it is desirable that a hunter conceal or camouflage his eyes as well as other portions of his body to avoid detection by potential prey.

Attempts have been made to provide devices to camouflage a hunter's face and eyes. One such device comprises a veil of camouflage netting depending from the brim of a hat or cap and covering the hunter's face. While this device effectively conceals a hunter's eyes, it is awkward to use and often interferes with the hunter's ability to aim and shoot his firearm. In addition, the veil tends to make rustling noises as the hunter moves his head thereby alerting the game to the hunter's presence.

Another device often used by hunters to conceal their eyes is a pair of conventional sunglasses. While sunglasses are more convenient than camouflage veils and are silent, they tend to produce reflections and glints as the hunter moves. Such reflections can often be more detectable by potential prey than the hunter's eyes themselves.

A need exists for a convenient, silent device for concealing a hunter's eyes that does not interfere with the hunter's use of his gun and that does not produce reflections or glints that can be detected by his prey. It is to the provision of such a device that the present invention is primarily directed.

SUMMARY OF THE INVENTION

The present invention is a pair of camouflage eyeglasses for concealing the eyes of a hunter. The glasses comprise a pair of substantially conventional eyeglass frames having two temple portions for extending across the ears of a wearer and a front frame portion defining two eye encircling rims. Mounted in each rim is an open weave camouflage netting material having color patterns adapted to match and blend into various hunting terrains. The spacing between individual threads of the netting material is such that a wearer's eyes are effectively concealed from potential prey while his eyesight is not significantly impaired by the material.

Thus it is seen that a pair of camouflage eyeglasses for concealing a hunter's eyes are provided that are convenient to use and that do not interfere with the hunter's ability to aim and shoot his firearm. The eyeglasses produce no noise or glints that can be detected by potential prey and, when not in use, the eyeglasses can simply be removed and placed in the hunter's pocket for storage.

Other features, advantages and objects of the invention will become apparent upon reading the following specification when taken in conjunction with the accompanying drawings.

BRIEF DESCRIPTION OF THE DRAWINGS

FIG. 1 is a perspective view of the camouflage eyeglasses showing the temple portions, front frame portions and the camouflage netting.

FIG. 2 is a perspective showing the front frame portions hinged upwardly exposing the bridge portion of the support member.

FIG. 3 is a front elevation of the camouflage eyeglasses.

FIG. 4 is a perspective view partially in section showing one method of attaching the netting to the rim.

FIG. 5 is a perspective view partially in section showing an alternate method of attaching the netting to the rim.

FIG. 6 is a perspective view partially in section showing one method of hingedly attaching the front frame portion of the camouflage eyeglasses to the supportbar.

FIG. 7 is a perspective view of an alternate embodiment of the invention for use by wearers of glasses.

DETAILED DESCRIPTION

Referring now in more detail to the drawings, in which like numerals represent like parts throughout the several views, FIG. 1 shows a pair of camouflage eyeglasses 10 having temple portions 11 adapted to extend adjacent a wearer's temples and over his ears to help support the eyeglasses on the wearer's face. Each temple portion 11 has a curved end 8 for extending around and behind a wearer's ear and is hingedly attached at its other end 9 to an end portion of an elongated support member 13. The support member 13 has substantially inverted Y-shaped bridge support 7 formed therein (FIG. 2) and extending downwardly from the support member 13 intermediate its ends for supporting the camouflage eyeglasses upon the bridge of a wearer's nose.

Front frame portions 12 comprise two generally circular rims 20 joined together by bridge portion 25 (FIG. 3). As best seen in FIG. 6, bridge portion 25 has a rectangular notch 28 formed in its upper edge and a hinge pin 26 extends between opposing vertical faces of the notch 28. Support member 13 includes an outwardly extending hinge element 14 intermediate its end portions. Hinge element 14 comprises upper jaw 23 and opposing lower jaw 24 with lower jaw 24 being in substantially spaced parallel relationship relative to the upper jaw 23.

Formed in inwardly opposing surfaces of the upper and lower jaw are opposing hinge pin accepting grooves 29. Support member 13 including hinge element 14 is preferably formed from a resilient material such as, for example, plastic, and upper and lower jaws 23 and 24 are spaced apart a distance less than the diameter of hinge pin 26 such that hinge pin 26 can be snapped into the hinge pin accepting grooves where the pin 26 is firmly but rotatably held between the jaws. In this way, front frame portion 12 can be hinged upwardly out of a wearer's line of sight when the camouflage eyeglasses are not in use as seen in FIG. 2.

Mounted within each rim 20 is camouflage netting material 16 formed from interwoven mutually perpendicular threads 19 and 21. The netting material 16 is dyed or otherwise tinted as seen in FIGS. 1 and 2 such that patterns of color defining lighter portions 18 and darker portions 17 are defined in the netting. As with other camouflage clothing, the colors and patterns formed in the netting are adapted to match and blend into the terrain where a hunter will be hunting. It will be understood that virtually limitless combinations of colors and patterns can be provided and that the drawings illustrate only one example of such a combination.

While the netting 16 can be woven with various mesh sizes, it is highly desirable that the mesh be small enough to conceal effectively the eyes of a hunter wearing the eyeglasses while large enough not to interfere significantly with the hunter's sight. It has been found that a mesh size in the range of 1.25 millimeters to 1.75 millimeters, preferably 1.5 millimeters, achieves these desired results. Smaller mesh sizes tend to obstruct a hunter's vision while larger mesh sizes provide inadequate camouflage for the hunter's eyes. In addition, it is desirable that the netting be woven from a durable, color fast, hypoallergenic material such as, for example, cotton or a cotton/polyester blend.

The frames are preferably formed of molded plastic but it should be understood that other materials can be used without departing from the spirit and scope of the invention. The frames should be formed to have a rough, non-reflecting surface to avoid glints being reflected from the frames. FIG. 4 illustrates a preferred method of attaching the netting 16 to the rim 20 of the camouflage eyeglasses in which the netting 16 is molded into the plastic rim at the time the rim is made. With this embodiment, the netting is rigidly attached to the rims. Rims having netting with various colors and patterns can be provided and the rims with the desired pattern attached to the support member 13 by snapping hinge pin 26 into hinge element 14.

An alternate method of attaching the netting is illustrated in FIG. 5. In this embodiment, the netting 16 is mounted onto a wire frame 22 having a size and shape slightly greater than the inner surface 15 of rim 20. The inner surface 15 of rim 20 has a groove 27 formed therein for accepting and firmly holding the wire frame 22 and consequently the netting 16 within the rim 20. With this embodiment, one wire frame bearing a netting of a particular camouflage color and pattern can be exchanged for other frames bearing other camouflage colors and patterns by simply snapping the first frame out of the groove 27 and snapping in the second frame. This could be particularly valuable to a hunter who frequently hunts in different types of terrain.

FIG. 7 illustrates an alternate embodiment of the invention for use by persons who normally wear corrective eyeglasses. This embodiment has frame portion 12 defining eye encircling rims 20. Formed on the back side of bridge portion 25 is a pair of clips 31 adapted to clip onto the upper portion of a wearer's eyeglasses with the netting material covering the front portions of the lenses. With this embodiment, a hunter who wears glasses can simply clip the camouflage frames onto his glasses for hunting and unclip them for storage when not in use.

While the invention has been described in terms of preferred embodiments, it should be understood that many obvious modifications, deletions, and additions can be made to these embodiments. By way of example and not limitation, the netting can be mounted to the front frame portion by simply covering the frame portion with the netting and attaching it with, for example, glue. The eyeglass frames themselves can have various camouflage colors and patterns thereon and the patterns and colors of the frames can be adapted to mesh with those of the netting. In addition, the invention is not limited to use by hunters but can have many other uses such as, for example, use by combat troops in military engagements to avoid detection by enemy troops. Many other enhancements obvious to those of skill in the art can be made to the invention without departing from its spirit and scope as set forth in the claims.

What is claimed is:

1. A pair of camouflage eyeglasses for concealing a hunter's eyes from wild game, said eyeglasses comprising:

a frame including a front frame portion defining a pair of substantially annular eye encircling rims and a bridge portion interconnecting said rims each of said rims having a groove formed around the inner circumference thereof;

a pair of elongated temple elements hingedly attached to said frame with each temple element adapted to extend adjacent a temple and over an ear of a wearer;

means for concealing a hunter's eyes from wild game, said means comprising an open weave netting formed from a first plurality of spaced apart strands of material and a second plurality of spaced apart strands of material, said first strands to define openings therebetween with the strands being spaced to conceal a hunter's eyes from potential prey while allowing the hunter to see through said openings; and mounting means for mounting said netting to said front frame portion, said mounting means comprising a pair of wire frames having a size and shape substantially corresponding to the size and shape of said rims, said netting being mounted to said wire frames and said wire frames being removably mounted to said rims within said grooves.

2. A pair of camouflage eyeglasses as claimed in claim 1 wherein said netting has color patterns formed thereon with said patterns and colors being adapted to match the colors and patterns of the terrain where a hunt takes place.

3. A pair of camouflage eyeglasses as claimed in claim 2 wherein said frame and said temple elements have non-reflecting surfaces and wherein said surfaces have color patterns formed thereon with said patterns and colors being adapted to match the colors and patterns of the terrain where a hunt takes place.

4. A pair of camouflage eyeglasses as claimed in claim 1 wherein said first plurality of strands are mutually parallel, said second plurality of strands are mutually parallel and wherein said first plurality of strands are substantially perpendicular relative to said second plurality of strands.

5. A pair of camouflage eyeglasses as claimed in claim 4 wherein the space between adjacent parallel strands of material is in the range of 1.25 millimeters to 1.75 millimeters.

6. A pair of camouflage eyeglasses as claimed in claim 5 wherein the space between adjacent parallel strands of material is substantially 1.5 millimeters.

7. A pair of camouflage eyeglasses as claimed in claim 1 wherein said frame further includes an elongated support member and wherein said temple elements are hingedly attached to the end portions of said support member and wherein said front frame portion is hingedly attached adjacent said bridge portion to said support member intermediate its ends whereby said front frame portion can be hinged upwardly out of the line of sight of a wearer when the camouflage eyeglasses are not in use.

8. A pair of camouflage eyeglasses for concealing a hunter's eyes from wild game, said eyeglasses comprising:
- a frame including a front frame portion defining a pair of substantially annular eye encircling rims connected by a bridge portion;
- means for concealing the eyes of a wearer of said eyeglasses from wild game, said means comprising an open weave netting positioned within said rims with said netting being formed from a first plurality of spaced strands of material and a second plurality of spaced strands of material with said second plurality of strands intersecting said first plurality of strands;
- said front frame portion being formed of molded plastic with said netting having a size and shape substantially corresponding to the size and shape of said rims and with the perimeter of said netting being embedded in said plastic adjacent the inner circumference of said rims.

9. A pair of camouflage eyeglasses as claimed in claim 8 further comprising a pair of elongated temple elements hingedly attached to said front frame portion with each temple element adapted to extend adjacent a temple and over an ear of a wearer to maintain said front frame portion in place with said rims substantially encircling the eyes of the wearer.

10. A pair of camouflage eyeglasses as claimed in claim 8 further comprising clip means for attaching said front frame portions to a pair of conventional eyeglasses with said rims extending about the eyeglass lenses.

11. A pair of camouflage eyeglasses comprising:
- means mounted to said front frame portion for concealing a wearer's eyes from wild game, said means comprising a cloth mesh netting formed from a first plurality of spaced strands of thread and a second plurality of strands of thread, said first plurality of spaced strands of thread intersecting said second plurality of strands of thread to define openings therebetween; and
- means for mounting said camouflage eyeglasses to a wearer with said eye encircling rims positioned about the wearer's eyes and said cloth mesh netting positioned in the wearer's field of view.

12. The camouflage eyeglasses of claim 11 wherein said cloth mesh netting has color patterns formed thereon.

* * * * *